Sept. 3, 1968  G. GALIMBERTI  3,400,033
MACHINE FOR INTERNAL APPLICATIONS AND MACHINING IN AN
ENDLESS TUBULAR ARTICLE MADE UP OF A THERMOPLASTIC
MATERIAL OR THE LIKE
Filed Sept. 15, 1965  7 Sheets-Sheet 1

INVENTOR:
GIANFRANCO GALIMBERTI
By E. M. Squire
HIS ATTY.

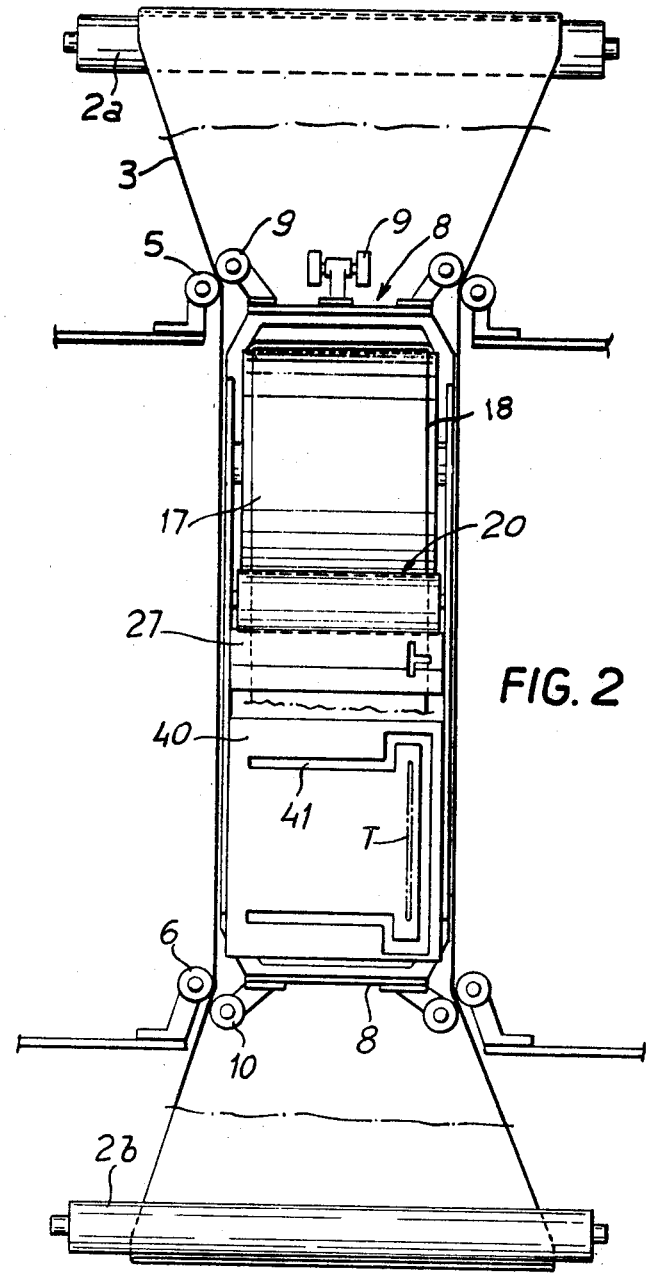

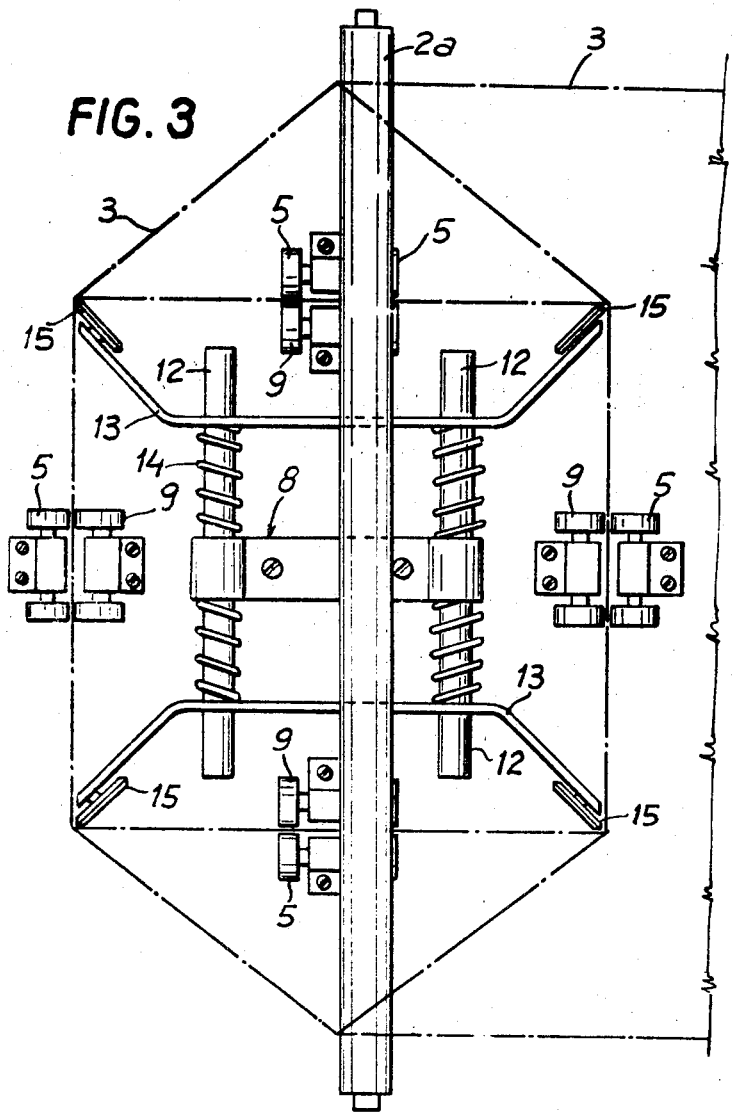

Sept. 3, 1968 G. GALIMBERTI 3,400,033
MACHINE FOR INTERNAL APPLICATIONS AND MACHINING IN AN
ENDLESS TUBULAR ARTICLE MADE UP OF A THERMOPLASTIC
MATERIAL OR THE LIKE
Filed Sept. 15, 1965 7 Sheets-Sheet 4
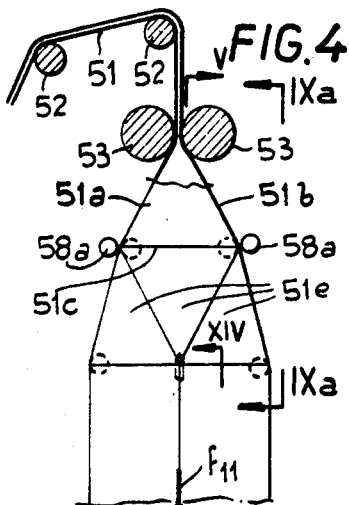
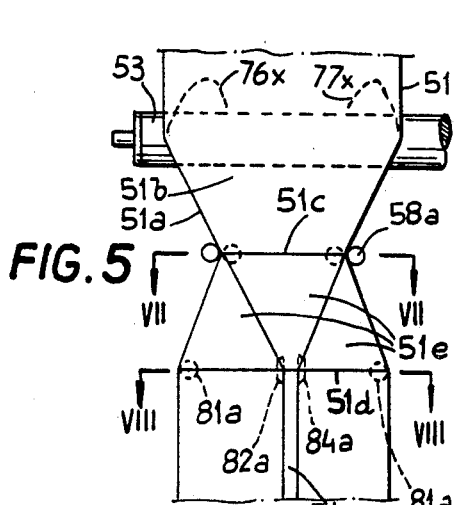
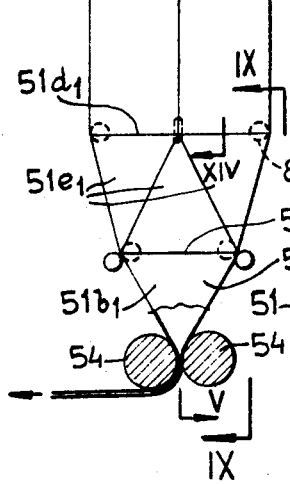
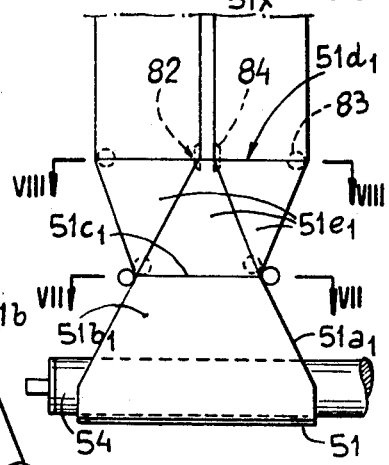
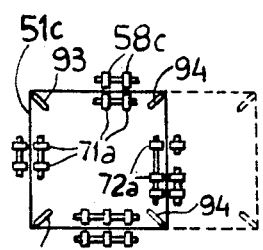
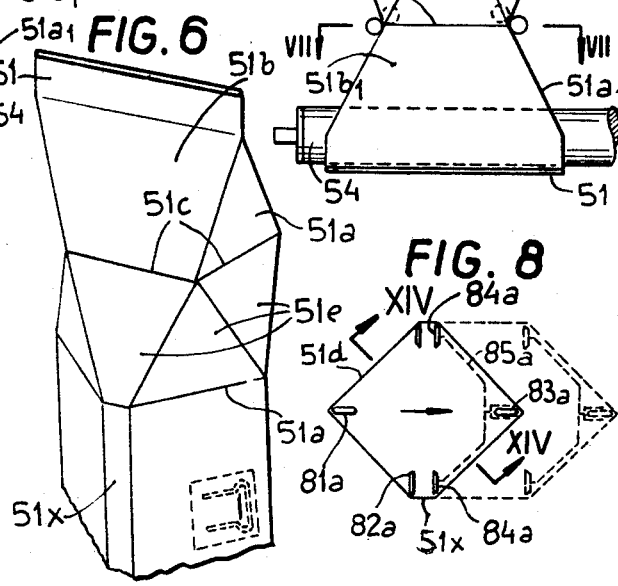
INVENTOR:
GIANFRANCO GALIMBERTI
E. M. Squire
HIS ATTY

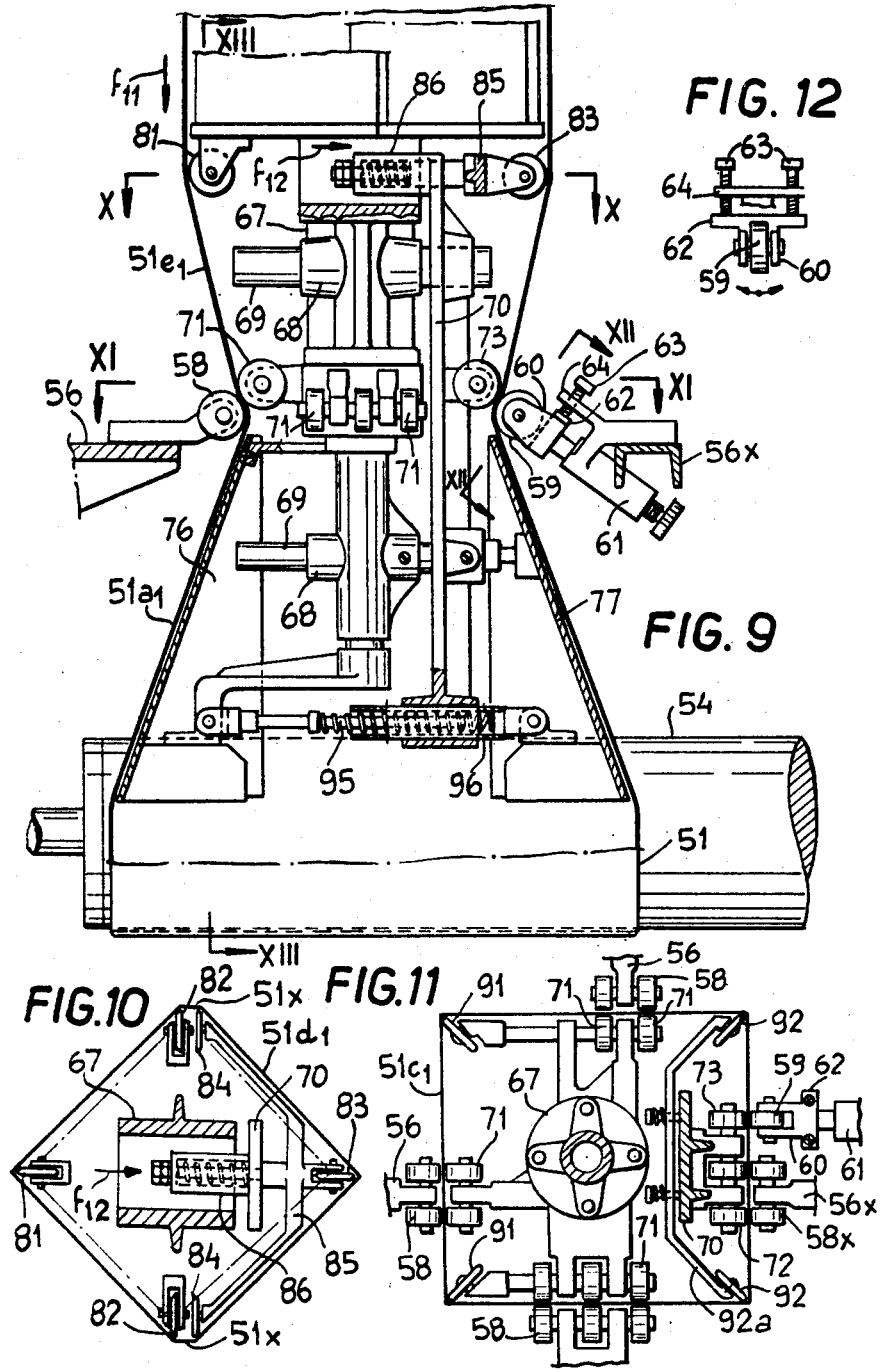

INVENTOR:
GIANFRANCO GALIMBERTI
by
E. M. Squire
HIS ATTY.

3,400,033
MACHINE FOR INTERNAL APPLICATIONS AND MACHINING IN AN ENDLESS TUBULAR ARTICLE MADE UP OF A THERMOPLASTIC MATERIAL OR THE LIKE
Gianfranco Galimberti, Via Pancaldo 4, Milan, Italy
Filed Sept. 15, 1965, Ser. No. 487,514
Claims priority, application Italy, Sept. 15, 1964, 20,076/64
13 Claims. (Cl. 156—514)

The invention relates to a machine for internally processing an open-ended length of tubular material, such as the application of a sheet of material to the inside wall of the tubular material to form, with a slit in said wall, a valve or pocket, or the application of a label or the like, particularly but not exclusively for the production of thermo-plastic or thermosetting tubular articles such as sacks or the like.

According to the invention there is provided a machine for internally processing an open-ended length of flexible tubular material, comprising an internal structure which is retained in the interior of the tubular material by means of rollers on said structure which are supported, through the wall of the tubular material, by rollers of an external structure, said internal structure having a supply of material to be applied to the internal surface of the tubular material, and means for applying said material, said applying means including working parts which are supported by said internal structure and are controlled from outside the tubular material and/or cooperate with members external to the tubular material, through the wall of the tubular material.

The invention will now be particularly described, by way of example only, with reference to the accompanying drawings in which:

FIG. 2 is a side view of the machine of FIG. 1;

FIG. 3 is a view, on a larger scale, of the top of the machine of FIG. 1 taken along the line III—III of FIG. 1, some parts of the machine having been removed;

FIGS. 4, 5 and 6 illustrate separately the arrangement of the tubular article and its guide members, according to another embodiment, respectively in a side view, in a view taken along the line V—V of FIG. 4 and in a partial perspective view;

FIGS. 7 and 8 are sections taken along the lines VII—VII and VIII—VIII respectively of FIG. 5;

FIG. 9 is a partial section taken along the line IX—IX of FIG. 4, with some parts in section and removed, said view being similar but tilted with respect to the view which would be obtainable along the line IXa—IXa of FIG. 4;

FIGS. 10, 11 and 12 are diagrammatic sections taken along the lines X—X, XI—XI and XII—XII of FIG. 9;

Figure 1:
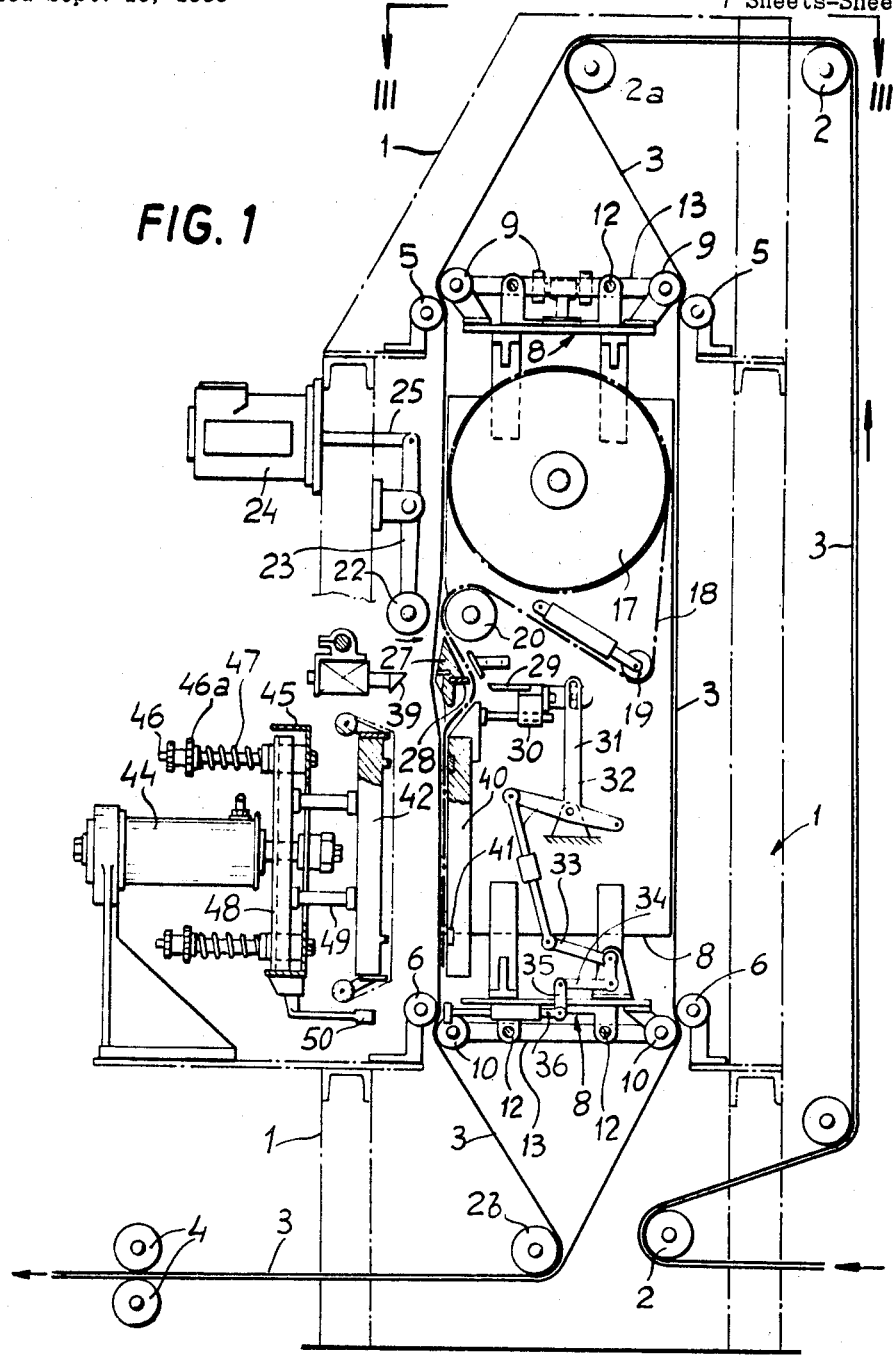
FIG. 1 is a diagrammatic vertical section through the machine, according to a first embodiment.
Figure 13:
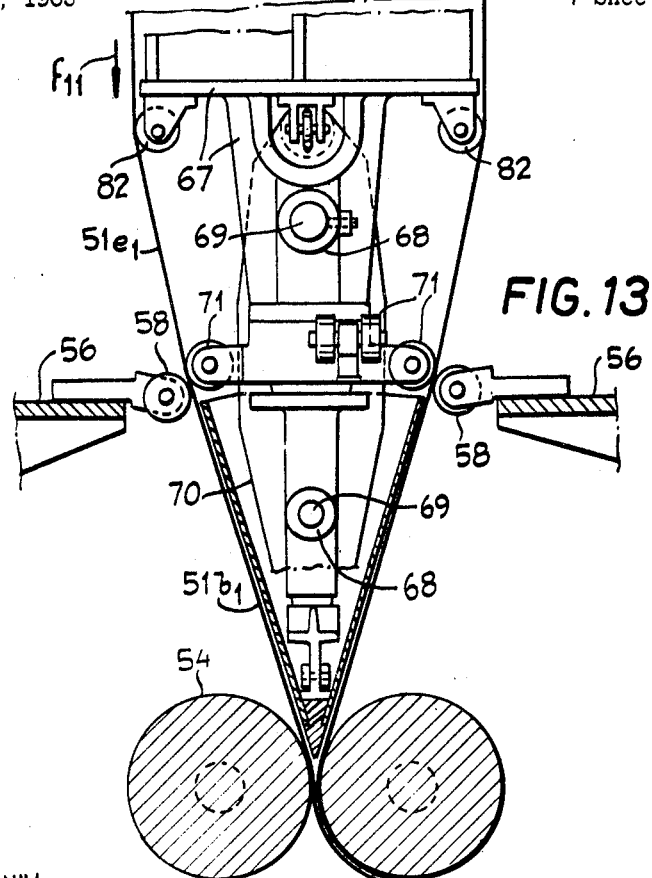
FIG. 13 is a section taken along the line XIII—XIII of FIG. 9.

In FIGS. 1 to 3, 1 denotes the stationary structure of the machine which is shown in broken lines. 2 denotes transmission rollers for a tubular film 3 which forms the flexible tubular material to be processed. 2a and 2b denote two of the transmission rollers of the material 3, and therebetween extends the material path over which the walls of the material are separated to open the material to accommodate the internal structure by means of which the material is to be processed. 4 denotes two rollers for pulling the tubular material. The stationary frame 1 is provided with upper supporting rollers 5 and lower centering rollers 6, which serve to support and centre the internal structure. This internal structure is generally denoted by 8 and includes upper rollers 9 and lower rollers 10, co-operating respectively with the rollers 5 and 6. The rollers 9 serve to support the structure 8 on the rollers 5 and the rollers 10 serve to centre the lower part of the structure 8 and to co-operate with the rollers 6 in preventing upward axial movement of the internal structure. The rollers 5, 6, 9, 10 are located on four sides of the structure 8 and preferably in pairs as is clearly shown in FIG. 3. The internal structure 8 is also provided with stretcher means which are designed to open the tubular material 3 approaching the structure 8 and return the material into the flattened arrangement after it has passed the structure 8. The structure 8 includes a pair of guides 12 (see FIG. 3) parallel to the axis of the upper transmission roller 2a, and two stirrups 13, urged apart by springs 14, the stirrups being slidable on opposite ends on the guides. Each of the stirrups 13 is provided at its ends with wheels 15, which form the upper stretching means which guide the material and open it out from the flattened state in which it is delivered from the roller 2a to a rectangular state which is defined by the outer profile of the four wheels 15. The structure 8 also includes additional stretching means at the lower end, to maintain the open state of the part of the tubular article extending between the deviation rollers 2a, 2b and to guide the material to the lower roller 2b. in the length intermediate the stretching means, the material 3 assumes a parallelopiped form inside which the internal structure 8 is located.

The strain applied to the tubular article is such as to maintain the shape of the tubular material constant at all positions between the rollers 2a and 2b.

The structure 8 is provided with a supply reel 17 for material 18, which in the present embodiment is to be applied to the inside of the tubular material 3. The material 18 passes around a stretching roller 19 and then around a feed roller 20, to the processing means which in particular is a welding device. In the unwinding of the material 18, from the reel 17, the roller 20 co-operates with an outer roller 22, which is carried by a movable structure 23 controlled for example by an electromagnet 24 through a linkage 25. When the roller 22 outside the material 3 is pressed against the roller 20 inside the material 3, both the wall of the tubular material 3 and the material 18 passing over the roller 20, are pinched between the rollers 20, 22. This operation has the effect of drawing the material 18 off the supply reel 17. The roller 22 may be a driven roller, but preferably the advance or feed of the material 18 is determined solely by the advance of the wall of the tubular article 3 under the pulling action of the rollers 4, thereby obtaining a positive and precise feed of the material 18.

Below the roller 20 and within the tubular material 3 is a member 27 mounted on the structure 8 and supporting a cutting blade 28, designed to co-operate with a blade 29. The blade 29 is mounted on a slide 30 on the structure 8 and is controlled by a linkage including a set of drive members 31, 32, 33, 34 and 35 leading to a push rod 36 whose end touches the wall of the material 3 to co-operate with an external control member hereinafter described.

The member 27 co-operates with an external blade 39, which is capable of being advanced and withdrawn by, for example, an electromagnetic control, to make longitudinal slits in the wall of the tubular article 3 during the advance thereof. The member 27 is disposed adjacent the part of the wall of the material 3 to be cut, and separates the material 18 from said wall after which the material 18 is approached again to the wall of the article 3 below the member 27.

Below the cutting zone, in the present embodiment, welding members are provided for welding the materials 3 and 18 to form pockets adjacent a longitudinal slit in the tubular material 3 for the purpose, for example, of making a filling valve for a sack. 40 denotes a dolly, carried by the structure 8, which is provided with a resilient zone 41 co-operative with an external die 42. In FIG. 2 the resilient zone 41 is shown and also a slit T (cut by the blade 29), the slit T being shown in FIG. 2 in the relative position which it assumes with respect to the welding formed along the profile of the zone 41 of the dolly. Corresponding to the parts 40, 41 there is provided outside the tubular article a welding die 42 capable of being advanced towards the parts 40, 41 and pressed thereagainst by a pneumatic cylinder system 44. The piston of the cylinder 44 moves a frame 45 provided with columns 46, around which are wound springs 47 re-acting between shoulders 46a (screw-adjustable on the columns 46) and a frame 48. This frame 48, by means of small columns 49, carries the die 42.

When a portion of the material 18 is advanced between the dolly 40 and the tubular material 3, in accordance with a predetermined program, at a certain point the advance of the tubular article 3 is stopped and the welding die 42 is advanced, and the material 18 is welded to the interior of the wall of the tubular article 3, where previously a slit T had been cut. Simultaneous with the advance of the die 42, a pin 50, driven by action of the cylinder 44, acts on the stem 36 and thus through the linkage 35, 34, 33, 32, 31, to drive the cutting member 29, which separates the portion of material 18 which has been welded or which is simultaneously welded.

FIG. 4 and subsequent figures relate to an embodiment in which the rectangular cross-section of the opened material is rotated around the centre in such a manner as to enable the internal material film to be applied adjacent one of the fold lines of the flattened tubular material which is fed to the machine.

According to this embodiment, the flattened tubular material 51 is fed over rollers 52, to a pair of feed rollers 53. After passing the rollers 53, the material is opened in the manner hereinafter described, to contain the internal structure and then is closed again by a pair of pulling rollers 54, after processing. As is seen in particular in FIGS. 4 to 6, the tubular material 51, after having passed the rollers 53, is opened by tensioning wheels hereinafter described to form on its surface two triangles 51a and two trapeziums 51b, thus assuring a rectangular cross-section at the level indicated by 51c, see also FIG. 7. Subsequently the material 51 is further deformed from the rectangular cross-section at 51c (in which two opposite sides are parallel to the axes of the rollers 53) to a shape in which the cross-section is still substantially rectangular but rotated by an angle smaller than 90° (in particular 45°) with respect to the cross-section at the level 51c. The latter cross-section is located at the level 51d and is obtained after a deformation of the material to form a plurality of substantially triangular surfaces indicated by 51e. From the level indicated by 51d the tubular material extends, in a prismatic shape, over the distance between levels $51d$–$51d_1$, the internal structure being located between these levels. Subsequently the material, before reaching the return rollers 54, undergoes deformations in a reverse sense substantially to form shapes symmetrical to those from 51a to 51e and denoted by the lower index "1." In FIGS. 9, 10, 11 and 13 the guide and tensioning means which impart the surface shapes $51e_1$ to $51a_1$, are shown in detail. 56 denotes the stationary frame member of the external structure and 56x indicates a transversely movable frame member of the external structure frame. The frame members 56, located substantially at the level of cross-section $51c_1$ of the tubular material, carries rollers 58 which serve to support the internal structure hereinafter described on three sides, the member 56x carrying rollers 58x on the fourth side. On the fourth side there is provided another roller 59 which is orientable as it is carried by a fork 60 of a unit supported and oriented within an inclined sleeve 61 (see FIGS. 9, 11, 12); a cross-member 62 of said unit being fixed in an angular position by screws 63 or the like, carried by a support 64 integral with the sleeve 61 and with the member 56x of the external structure.

Additional upper rollers 58a are provided at the level of the cross-section 51c and serve to centre the internal structure, some of the rollers being transversely movable like the rollers 58x.

The internal structure is generically indicated by 67 and FIGS. 9, 10, 11 and 13 in particular show the lower portion thereof with the guide means which impose on the material the surface shapes $51e_1$ to $51a_1$. The internal structure 67 is substantially symmetrical in the upper portion. The lower portion of the structure 67 is provided with guide means 68 for two rods 69 (see FIGS. 9 and 13) which support a plate 70; the plate, with the various members connected thereto, being movable in a direction transverse to the direction of sliding movement of the material indicated by arrows $f_{11}$, so that it can be fixed in a preselected position dependent on the width of the tubular material. The structure 67, at the level of the cross-section $51d_1$, is provided with rollers 71 designed to co-operate with the rollers 58 and to support the internal structure 67. The plate 70 carries rollers 72, designed to co-operate with the rollers 58x of the frame member 56x which is transversally adjustable in a similar manner to the plate 70. A roller 73 on the plate 70 is mounted in a pivoted bearing to co-operate with the roller 59 so that inclination of the axis of roller 73 will automatically adopt a position corresponding to that of the roller 59 for a purpose described below. The roller 59 may be urged towards the roller 73 by resilient means, not illustrated, which act in the direction of the axis of the sleeve 61.

The structure 67 in its upper section, substantially at the level of the cross-section 51c, is provided with rollers 71a and 72a (see FIG. 7) co-operative with the rollers 58a of the stationary structure and operationally similar to the lower rollers 71 and 72, an adjustable plate being provided similar to the lower plate 70. It is not necessary to provide the pair of orientable rollers 59, 73, whose function is only required adjacent the pulling rollers 54.

The internal structure 67 carries an apron 76, having a shape corresponding to the profile of one of the triangles $51a_1$ and of the adjacent portion of the trapeziums $51b_1$. The plate 70 carries an apron similar and symmetrical to the apron 76. Similar aprons are carried by the structure 67 of the upper section, adjacent the rollers 53, one of the aprons being adjustable on a plate similar to the plate 70. The upper aprons have shapes with upper introduction profiles 76x–77x (FIG. 5) to facilitate the sliding of the material 51 thereon.

At the level of the cross-section $51d_1$ (see FIG. 10), the internal structure 67 is provided with tensioning wheels 81 and 82 whereas the plate 70 is provided with a tensioning wheel 83, substantially symmetrical with the wheel 81 and two wheels 84 capable of being located side by side to the wheels 82. More particularly, the wheels 83, 84 are carried by a supporting stirrup 85 (see FIGS. 9 and 10) which is slidably guided in a guide sleeve 86 of the plate 70. The sleeve 86 contains resilient means which urge the supporting stirrup 85 and thus the wheels 83 and 84 in the direction of the arrow $f_{12}$ of FIGS. 9 and 10. In FIG. 8 a stirrup 85a, similar to the stirrup 85 and shown in broken line, carries wheels 83a. 84a similar to the wheels 83, 84 while the stationary structure at the same level carries wheels 81a, 82a (FIGS. 5 and 8). The stirrup 85a is urged in the direction of the arrow $f_{13}$ of FIG. 8, being mounted resiliently on a plate similar to the plate 70. The wheels 81a, 82a, 83a, 84a define the cross-section of the tubular article at the level of the cross-section 51d (FIG. 8) whereas the wheels 81, 82, 83, 84 define the cross-section of the tubular article at the level of the cross-section $51d_1$ (FIG. 10). The stirrup 85 supporting the wheels 83, 84, 84, and the corresponding stirrup 85a supporting the wheels 83a, 84a, 84a are urged resiliently as above stated in the direction of the arrows $f_{12}$ and $f_{13}$ to compensate for small variations of transverse dimensions of the tubular article, and thus form small flat lengths $51x$ between the wheels 82a, 84a and 82, 84.

At the level of the cross-section $51c_1$ there are provided tensioning wheels 91 on the structure 67, and tensioning wheels 92 on the plate 70. The wheels 92 are assembled on a support 92a resiliently mounted on the plate 70 to slide perpendicular to the axis of the rollers 72, so as to compensate for small variations of width of the tubular article. At the level of the cross-section $51c$ there are provided tensioning wheels 93 and 94 (see FIG. 7) mounted in a similar manner to the wheels 91 and 92.

The structure 67 rigidly supports the apron 76, and the plate 70 resiliently supports the apron 77 through rod 95 and sleeve 96 in such a manner to compensate for small variations of transverse dimensions of the tubular article. The aprons are mounted in a similar way in the upper end of the structure 67.

The plate 70 and the corresponding one at the upper end of the internal structure, with all the members connected thereto rigidly or resiliently, are transversally movable to set the machine for tubular articles having substantially different widths.

Figure 15:
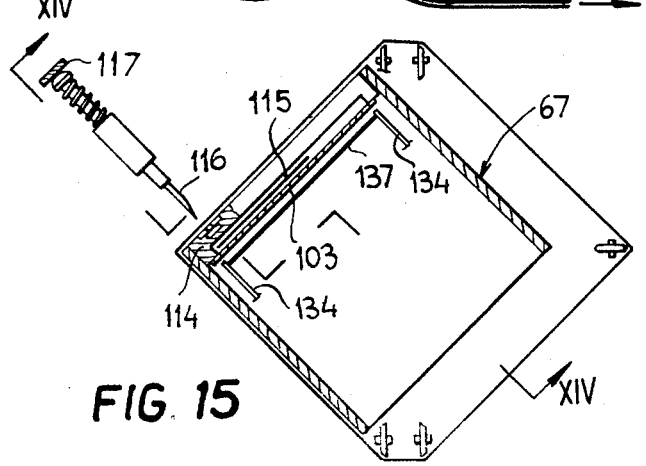
FIG. 15 is a section taken along the line XV—XV of FIG. 14.
Figure 14:
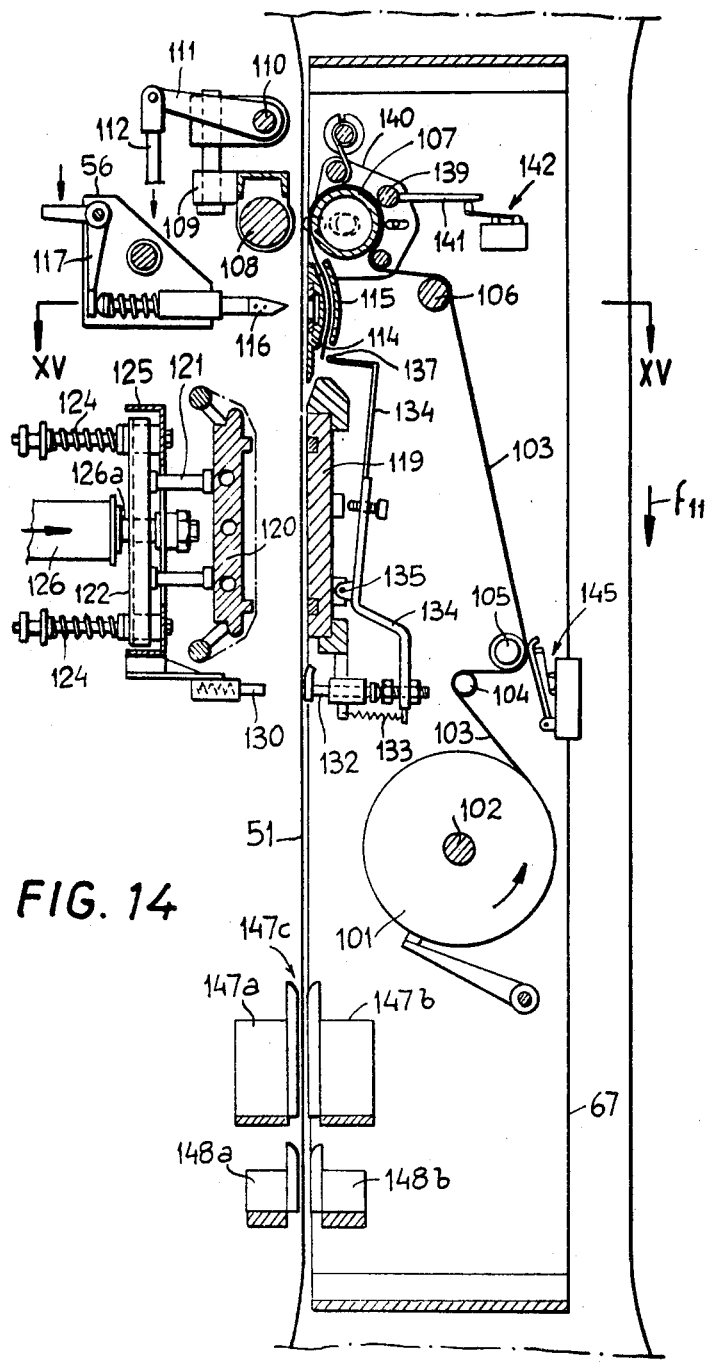
FIG. 14 is a section taken along the line XIV—XIV of FIGS. 4, 8 and 15.

In the middle portion of the internal structure 67 means are provided similar to those of the previous embodiment, to apply portions of a thermoplastic layer to the interior of the tubular material. In FIGS. 14 and 15 some of these members are illustrated diagrammatically.

101 denotes a supply reel on which has been wound a strip of film, the reel being mounted on a shaft 102 and the film 103 supplied thereby is fed by rollers 104, 105 and 106 to a roll 107 around which it passes adjacent one side of the prism which is formed by the material 51 between the cross-sections $51d$ and $51d_1$. 108 denotes a pressure roll external to the tubular material 51, in a position opposite the roll 107. The roll 108 is mounted on a support 109 which can oscillate around a shaft 110 and is moved by a linkage 111, 112 towards the internal roll 107 so as to engage both the material 51 and the strip film 103. When the roll 108 is pressed against the roll 107, the strip 103 is unwound by the advance of the tubular material 51 without relative slip therebetween. Below the roll 107 is a member 114, which forms a channel 115 to separate the strip 103 coming from the roll 107, from the internal surface of the material 51. A blade 116, having a vertical cutting edge, is provided on the outside of the member 114 and can be promptly advanced by a linkage 117 to cut a longitudinal slit in the advancing material 51. From the channel 115, the strip 103 is then moved forward again against the internal surface of the material 51, between this and a member 119 forming a dolly and is disposed adjacent the material 51 in the zone wherein the slit has been formed and in which a portion of the strip 103 is to be welded to the material 51. On the outside of the material 51, in front of the member 119, a welding die 120 is arranged. The die 120 is supported through rods 121 by a frame 122 which can slide on small rods 124. The small rods 124 are carried by a counter frame 125, in turn supported by the movable rod 126a of a cylinder-piston control device, of which 126 denotes the cylinder supported by the external stationary frame. Upon actuation of the cylinder-piston device, the die 120 is pressed against the dolly 119 to weld the terminal portion of the strip 103 to the material 51. The welding can occur along a line similar to the line 41 of the previous embodiment and in a relative position similar to that indicated by T in FIG. 2 of the previous embodiment.

The counter frame 125 carries a control pin 130 which acts through the wall of the material 51 (which is flexible) on a stem 132 slidable on the internal structure 67. This stem acts against a return spring 133, on a lever 134 pivoted at 135 to the member 119, the lever carrying at its upper end an electric resistance wire 137. When the wire 137 contacts the strip 103, it cuts the strip between the member 114 and the member 119.

A friction roller 139, carried between pivoted side plates 140, is urged resiliently against the strip 103 as it passes over the roller 107, when the roller 108 is moved back from the material 51 and from the roll 107. An arm 141 integral with the friction roller 139 operates a safety switch 142 to stop the operation of the machine when the strip 103 has not been fully cut by the resistance wire 137 since in this event the roller 139 is rotated by friction with the strip 103 when the strip 51 together with the unsevered end of the strip 103 welded thereto begins to advance again after the welding operation.

A switch 145 is provided adjacent the transmission roller 105 to signal breakage of the strip 103, or exhaustion of the supply.

147a and 147b denote the primary and secondary windings of a transformer which are arranged on the outside and inside respectively, of the material 51, with a gap 147c through which the tubular material passes. This transformer can serve to supply current to the resistance wire 137, to heating resistors of the welding dolly 119, and to other electric members as required. At least a second similar transformer 148a, 148b can be provided for the transmission of electric signals from the switches 142 and 145 or others, to the outside of the tubular material.

In the embodiment of FIGS. 4 to 15 the internal structure is supported on the lower rollers 58, 58x, 59 and thus the material 51 is tensioned in traction only between the rollers 58, 58x, 59 and the pair of rollers 54, whereas above the tension is restricted to the mere friction required for the correct unwinding of the material. The upper rollers serve to centre the internal structure.

The roller 59 and the co-operating oscillatory roller 73 serve to compensate for the effect of inevitable positioning irregularities of the stretching means and of the bearing and centering rollers. Such irregularities have a tendency to result in a torsional deformation of the tubular material which would tend to pass into the rollers 54, so that the material is flattened in a twisted state. The orientation of the roller 59 imposes deformations in a direction opposite to those which are spontaneously set up so as to cause the tubular material to be returned by the pair of cylinders 54 to the same shape and folded along the same lines as it was when supplied from the rollers 53.

Also in the embodiment of FIGS. 4 to 15, the tensioning wheels ensure the correct change of shape of the tubular material with respect to the internal structure and ensure that the longitudinal development of the generating lines of the article between the pair of rollers 53 and 54 are absolutely equal along all the periphery of the deformed sections, as in the previous embodiment. This condition is also maintained even if the subsequent sections are deformed and/or rotated. With the deformation of the rectangular cross-section, the internal application of material and the cutting of the tubular material may be effected adjacent one of the folding lines of the tubular material 51 or in any other position along the periphery.

The drawing illustrates only two embodiments of the invention by way of example, and variations may be made as necessary by those skilled in the art. For instance, although welding has been referred to means can be provided in the structure 8 for carrying out other processes on the tubular material.

Further, by means of the described electric drive system, one may also control an internal motor driving, for instance, the roller 20 or other members for other functions. The internal structure and the longitudinal geometrical axis of the working zone of the tubular material, although described as vertical, could be horizontal or inclined.

It should be noted that, in the opened portion, the tubular material is deformed in such a manner as always to maintain a longitudinal development constant for all the longitudinal generating lines at any point of the periphery of the cross-section. The deformations will be such as to generate minimum friction, and therefore, the tensioning wheel means will have the minimum number of bearings consistent with the formation of flat surfaces in the tubular material.

I claim:

1. A machine for internally processing an open-ended length of flexible tubular material comprising,
   an internal structure to be disposed within the tubular material,
   an external structure to be disposed outside the tubular material,
   first rollers on said internal structure,
   second rollers on said external structure, said first and second rollers being arrayed opposite one another to engage the internal and external surfaces of tubular material and thereby support the internal structure within the tubular material whilst permitting the tubular material to be moved longitudinally relative to said structures,
   a supply of strip material, in said internal structure, for application to the internal surface of the tubular material,
   means for applying said strip material, and
   means external to the tubular material and acting through the flexible wall of the tubular material to co-operate with said strip material applying means in applying said material.

2. A machine according to claim 1 wherein said supply of material comprises a reel of strip material and wherein said internal structure further comprises
   a strip-feed roller and means supporting said strip-feed roller adjacent the internal surface of the tubular material for guiding strip material supplied from said reel, into juxtaposition with said internal surface of the tubular material,
   a pressure roller, and means mounting said pressure roller on said external structure for movement toward the strip-feed roller to press the tubular material and strip material therebetween and thereby cause the strip material to be entrained by friction with the tubular material as the latter is moved relative to said structures.

3. A machine according to claim 2 wherein said internal structure further includes
   a cutter for the strip material,
   a linkage for operating said cutter, and having a part thereof in engagement with the inner surface of the tubular material
   means, external of the tubular material, engageable with the outer surface of the tubular material opposite said part of the linkage and movable to move the wall of the tubular material and thereby actuate said linkage.

4. A machine according to claim 1 having
   a transformer, of which one winding is located outside the tubular material and another winding is located inside the tubular material, for passing electrical energy or electrical signals to or from any electrical parts of the internal structure.

5. A machine according to claim 1 wherein said internal structure further comprises
   guide means on one end thereof for changing the tubular material, as it moves past the internal structure, from a flattened state to an open state, in which open state it is of substantially rectangular cross-section with two sides parallel to the sides of the flattened material, and
   further guide means on the opposite end of the internal structure for returning the tubular material from its open state to its original flattened state.

6. A machine according to claim 1 wherein said internal structure further comprises
   guide means on one end thereof for changing the tubular material, as it moves past the internal structure, from a flattened state to an open state, in which open state it is of substantially rectangular cross-section with two sides parallel to one another and skewed relative to the sides of the flattened material, and
   further guide means on the opposite end of the internal structure for returning the tubular material from its open state to its original flattened state.

7. A machine according to claim 6 wherein
   said guide means are supported on said internal structure by resilient members which act to compensate for small variations of the transverse dimensions of the tubular material and to tension said tubular material.

8. A machine according to claim 1 further comprising
   a flat member, and means mounting said flat member on said internal structure for movement transverse to the direction of movement of the tubular material to engage and support a flat wall of the tubular material.

9. A machine according to claim 1 having
   cutting means movably mounted on said external structure and co-operative with the internal structure to form longitudinal slits in the wall of the tubular material.

10. A machine according to claim 2 having
    an electrically-heated element for cutting said strip material, and
    a transformer whose secondary winding is disposed within the tubular material and is electrically connected to said element and whose primary winding is disposed outside the tubular material.

11. A machine according to claim 5 having
    an orientable roller supported outside the tubular material and a roller mounted on an oscillatory bearing supported on said internal structure within the tubular material, the two rollers being arranged to co-operate and to act on the tubular material as it is returned from its open state to its flattened state to remove twist from the tubular material and thereby ensure that it is reflattened with edges along the same lines as in its original flattened state.

12. A machine for welding a strip of material to the inside of a length of tubular material, comprising
    an internal structure to be supported within the tubular material,
    an external structure to be disposed outside the tubular material,
    first rollers on said internal structure,
    second rollers on said external structure, said first and second rollers being arrayed opposite one another to engage the internal and external surfaces of the tubular material and thereby support the internal structure within the tubular material yet permit the tubular material to be moved longitudinally with respect thereto,
    a reel of said strip material rotatably supported on said internal structure and means for guiding the strip material into side-by-side relationship with the wall of the tubular material,
    a welding device comprising a first part on said internal structure and a second part co-operative with said first part to press and weld the tubular and strip materials together, said second part being mounted on said external structure for movement toward and away from said first part.

13. A machine according to claim 12 wherein said strip-guiding means comprise
    a feed roller rotatably supported on the internal structure and a pressure roller rotatably supported on the external structure and movable toward the feed roller to press the tubular and strip materials into frictional engagement with one another so that the strip material is drawn from the reel as the tubular material advances, and further comprising guide means on one end of said internal structure for opening out the tubular material from a flattened state to an open state having a rectangular cross-section, further guide means on the opposite end of said internal structure for returning the tubular material from its open state to its flattened state, and means on said external structure for cutting slits longitudinally in the wall of the tubular material.

References Cited

UNITED STATES PATENTS

| | | | |
|---|---|---|---|
| 3,069,303 | 12/1962 | Scholle | 156—583 |
| 2,100,587 | 11/1937 | Chalker | 117—95 |
| 2,767,431 | 10/1956 | De Laubarede | 117—95 |

DOUGLAS J. DRUMMOND, *Primary Examiner.*